Figure 1:
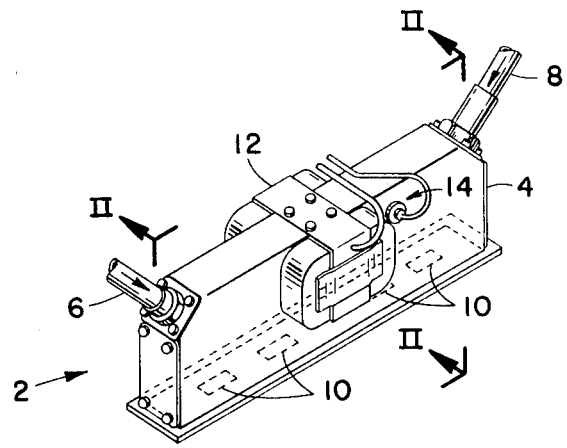

United States Patent

[11] 3,590,873

| [72] | Inventors | Billy E. Duff<br>Richardson;<br>Joe D. Usry, Arlington, both of, Tex. |
|---|---|---|
| [21] | Appl. No. | 748,013 |
| [22] | Filed | July 26, 1968 |
| [45] | Patented | July 6, 1971 |
| [73] | Assignee | LTV Electrosystems, Inc.<br>Greenville, Tex. |

[54] VALVE MECHANISM
9 Claims, 6 Drawing Figs.

[52] U.S. Cl. .................................................. 137/625.46,
251/131, 251/129, 137/625.18
[51] Int. Cl. .................................................. F16k 31/04
[50] Field of Search .......................................... 251/131,
133, 134, 283; 137/625.64, 625.19, 609, 625.18,
625.46

[56] References Cited
UNITED STATES PATENTS

| 2,678,661 | 5/1954 | Roper et al. ............... | 251/134 X |
| 2,718,982 | 9/1955 | Long .......................... | 251/131 X |
| 2,833,508 | 5/1958 | Bydalek et al. ............ | 251/131 |
| 2,880,756 | 4/1959 | Puls............................ | 251/283 X |
| 3,211,182 | 10/1965 | Gyurik et al. ............. | 137/625.64 X |
| 3,232,092 | 2/1966 | Glassey ...................... | 251/131 X |
| 3,443,593 | 5/1969 | Colombo..................... | 251/283 X |

*Primary Examiner*—Arnold Rosenthal
*Attorney*—James D. Willborn

ABSTRACT: A valve mechanism for regulating the flow of fluid including a valve body having a chamber with a movable valve spool disposed therein. A valve actuator is operatively connected to the valve spool for moving the valve spool between a closed position and a predetermined open position. A control system is provided which is operable to detect movement of the valve spool from the predetermined open position and for generating an error signal which is effective to energize the actuator to return the valve spool to the predetermined open position.

PATENTED JUL 6 1971

3,590,873

SHEET 1 OF 2

BILLY E. DUFF
JOE D. USRY
INVENTORS

BY Robert M. Sperry

ATTORNEY

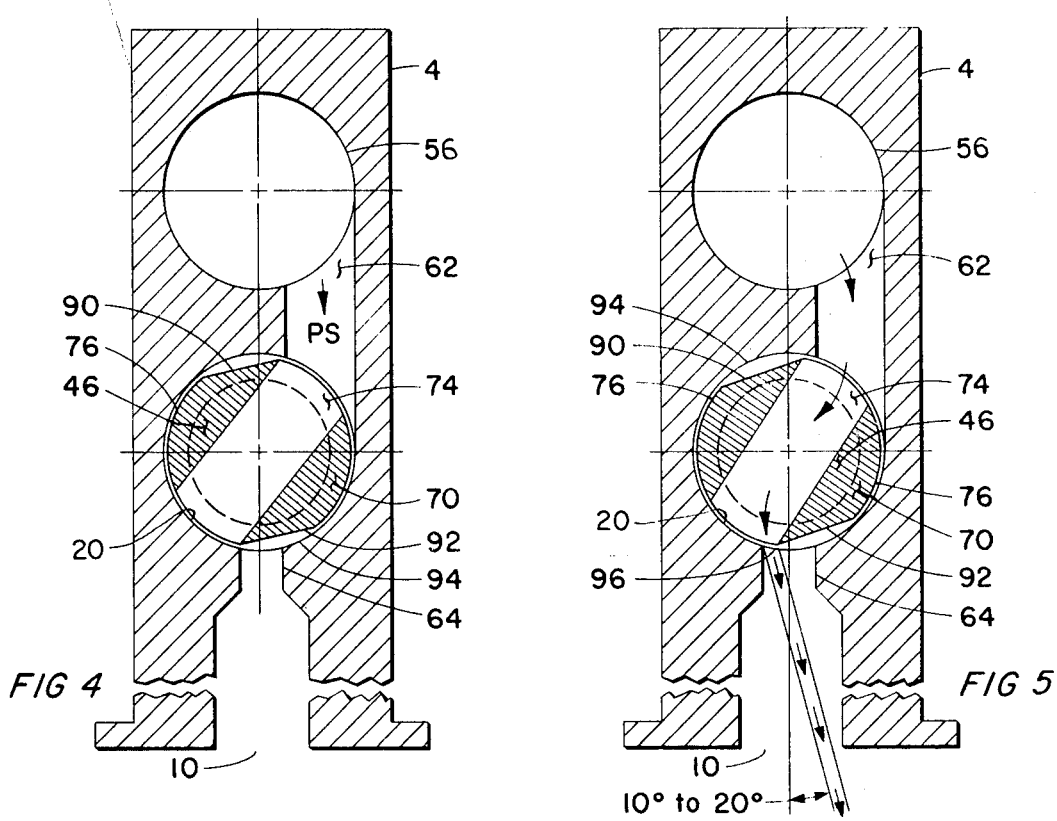
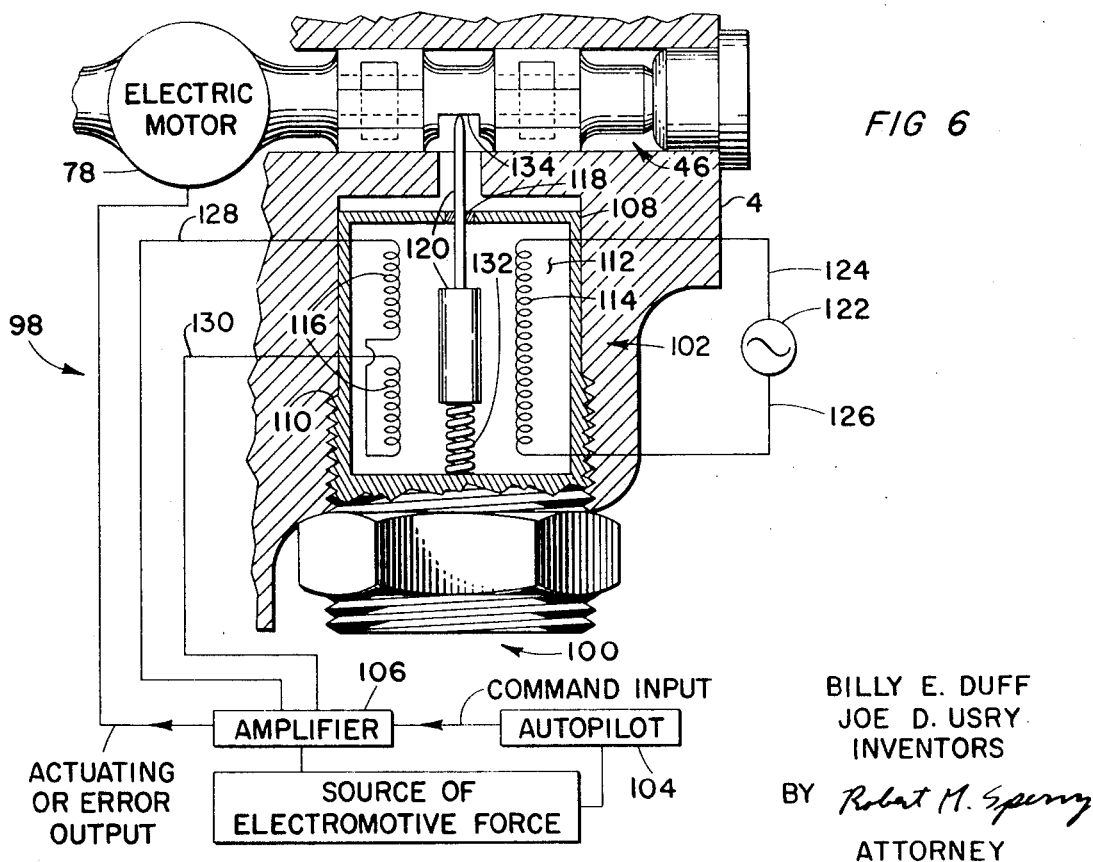

VALVE MECHANISM

The present invention relates to improvements in fluid control apparatus and more particularly to an improved fluid control valve.

In the past, numerous and extensive efforts have been undertaken to reduce vibration, wear, and differential sticking or freezing of a valve spool within a complementary valve cavity. Differential sticking is usually caused by the creation of a pressure differential between a valve inlet and outlet, and the attendant resultant force tends to move the outer surface of the valve spool toward and into engagement with an internal surface which defines the valve cavity; thus, such a pressure differential will cause the valve spool to bind or freeze to the internal surface of the valve cavity. This binding or freezing of the outer surface of the valve spool to the interior surface of the valve cavity generally produces extreme frictional forces which result in marring, gouging, scratching, and distortion of these complementary, close-fitting surfaces. Since the valve is designed to function as a fluid control device, any destruction or distortion of the outer surface of the valve spool or the internal surface which defines the valve cavity could cause leakage of fluid therebetween which can impair or destroy the desired fluid control for which the valve was initially designed. Generally, a bypass conduit or orifice which interconnects the valve inlet with the valve outlet is employed in an attempt to equalize the fluid pressure therebetween.

In an effort to solve and/or minimize the problem of differential sticking, extremely complex and expensive pressure equalization systems have been devised, and while these prior art pressure equalization systems have lessened the problems somewhat, a satisfactory solution has yet to be discovered. Moreover, the rate of wear between the outer surface of the valve spool and the complementary internal surface of a valve spool, in prior art valve mechanisms, is greatly increased due to vibration and frictional contact; and such inefficiency is extremely undesirable and far from the desired operating requirements for most valve mechanisms.

A primary object of the present invention is concerned with the provision of an improved flow control mechanism that automatically maintains a rate of flow for a desired volume discharge demand with minimized complexity.

Another object of the present invention is to provide a control system that continuously monitors and detects movement of a valve spool from a predetermined open working position and is responsive to substantially any movement of the valve spool therefrom to return the valve member to the predetermined open working position.

A further object of this invention is to provide a valve having means for balancing the forces on substantially all surfaces of the valve spool to inhibit differential freezing of the valve spool within a valve bore which receives said spool.

Other objects and advantages will be apparent from the specification and claims and from the accompanying drawing illustrative of the invention.

Figure 2:
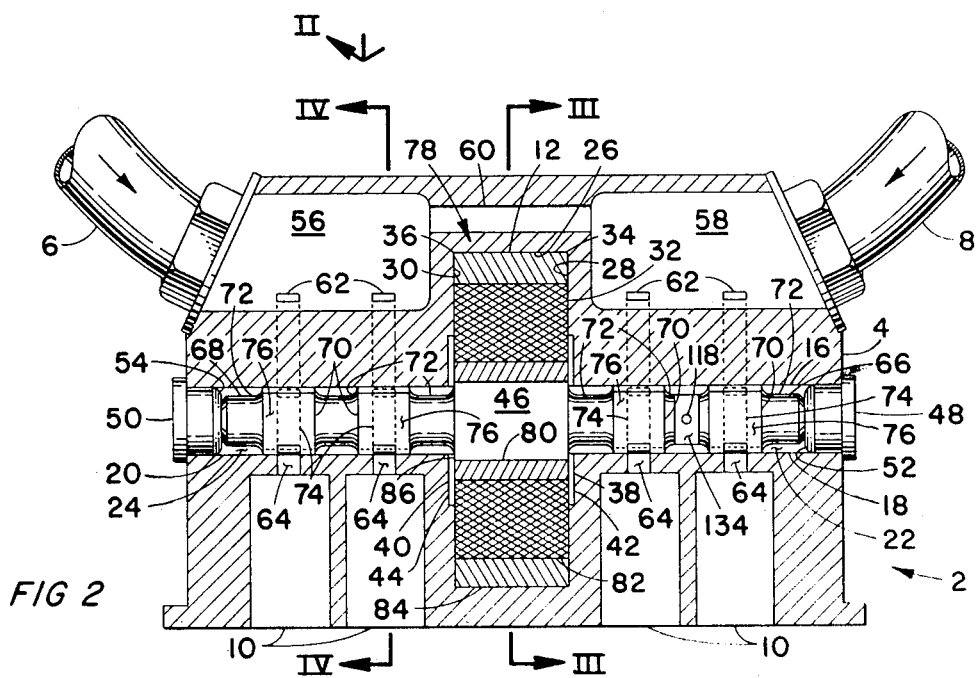
Figure 3:
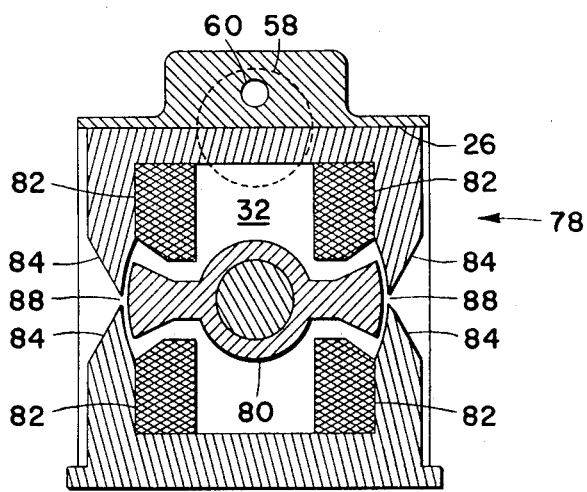

In the drawing:

FIG. 1 is a perspective view of a valve mechanism of the present invention,

FIG. 2 is a sectional view of the valve mechanism taken along line II–II of FIG. 1, FIG. 3 is an enlarged sectional view of the valve mechanism taken along line III–III of FIG. 2, FIG. 4 is an enlarged sectional view of the valve mechanism taken along line IV–IV of FIG. 2, showing the valve spool in a closed position, FIG. 5 is an enlarged sectional view of the valve mechanism taken along line IV–IV of FIG. 2, showing the valve spool in its desired predetermined open working position, and FIG. 6 is a schematic diagram of the control system usable in conjunction with the valve mechanism.

Certain terminology will be used in the following description for convenience in reference only and will not be limiting. The words "upwardly," "downwardly," "rightwardly," and "leftwardly" will designate directions in the drawing to which reference is made. The words "inwardly" and "outwardly" will refer to directions toward and away from, respectively, the geometric center of the apparatus and designated parts thereof. Said terminology will include the words above specifically mentioned, derivatives thereof and words of similar import. In addition, it is to be understood that the following description of the device and operation of certain apparatus is not to be taken as limiting this invention in any respect.

For the purpose of disclosure of the automatic proportional control assembly embodying the present invention, reference is now made to FIG. 1 which shows an electromagnetic rotary valve arrangement or means 2 comprising an elongate, rectangular valve body or housing 4. The valve body 4 is provided with a pair of spaced, opposed fluid supply conduits or pipes 6 and 8 which are connected to opposite ends of the valve body; and a plurality of fluid discharge openings 10 are provided on one side of the valve body 4. A valve actuator 12, which will be subsequently described, is located in substantially the center of valve body 4 and a feedback assembly 14 (to be described later) is positioned adjacent the valve actuator.

The valve body 4 is provided with an elongate, hollow cavity 16 which extends substantially the entire length of valve body 4, as illustrated in FIG. 2 of the drawing to which reference is now made. The valve cavity 16 is provided with at least a pair of spaced, continuous, internal, cylinderlike wall or surface portions 18 and 20 which respectively define spaced, axially aligned, cylinderlike end portions or chambers 22 and 24. The cylinderlike end portions 22 and 24, preferably, have substantially identical cross-sectional areas and configurations; however, under some circumstances and for other applications, it could be found desirable to vary the cross-sectional area and/or configuration of one end portion with respect to the other end portion. An intermediate cylinderlike wall or surface portion 26 is structurally associated with a plurality of spaced sidewalls 28 and 30 to define a centrally disposed, enlarged chamber 32. The sidewalls 28 and 30 extend radially inwardly from the spaced, substantially parallel outer peripheral edges 34 and 36, respectively, of surface portion 26 toward and intersect surface portions 18 and 20; thus cavity 16 which extends completely through valve body 4 comprises chambers 22, 24, and 32. Moreover, the chambers 22, 24, and 32 can be disposed in an aligned relationship about a common axis, which could coincide with the longitudinal axis of valve body 4. The sidewalls 28 and 30 are provided with inwardly opening circumferential grooves 38 and 40, respectively, which are disposed adjacent respective chambers 22 and 24. Each groove 38 and 40 is constructed and arranged to receive a respective sealing gasket 42 and 44; however, a suitable packing ring, which is fabricated from conventional sealing material can be utilized to prevent the passage of fluid between the outer surface of rotatable valve spool 46 and sidewalls 28, 30 into chamber 32. The outwardly opening end portion of each chamber, 22 and 24, is effectively closed, respectively, by suitable fluid sealing plugs 48 and 50; and these plugs could be welded in place or secured to valve body 4 in any desired manner. The inner surfaces 52 and 54, of plugs 48 and 50, are effective to function as abutment or stop means for limiting the longitudinal movement of valve member 46 relative to valve body 4. The valve body 4 has a pair of spaced, fluid inlet supply manifolds 56 and 58 which are interconnected by an opening or orifice 60 for permitting the equalization of pressure between said manifolds. The fluid inlet supply manifolds 56 and 58 are, preferably, superposed with respect to cavity 16 and are connected through fluid supply pipes or conduits 6 and 8, respectively, to a source of pressurized fluid (not shown). The supply conduits 6 and 8 could be provided with suitable valves (not shown) for regulating or adjusting the supply of fluid to manifolds 56 and 58. The inlet supply manifolds 56 and 58 communicate with chambers 22 and 24, respectively, through a plurality of spaced, substantially parallel inlets or ports 62; and fluid is subsequently discharged from chambers 22 and 24 through a plurality of spaced, substantially parallel, discharge outlets or ports 64. The valve member 46 is rotatably received within the confines of cavity 16 and has opposite end portions 66 and 68 that are provided with a plurality of longitudinally spaced lands or annuli 70 which are separated by annular grooves or recessed portions 72. Each annulus 70 is provided with at least one diametrically disposed port or opening 74 extending therethrough. The openings 62, 64 and 74, preferably, have a rectangular configuration in cross section taken in a horizontal plane; however, these openings could have other desirable configurations. Each annulus 70 has an outer peripheral surface portion 76 that is disposed in a complementary close-fitting relationship with respect to the interior surfaces 18 or 20 which define chambers 22 and 24; and the outer surface portion 76 has substantially the same configuration as its complementary internal surface portion 18 or 20. The rectangular ports 74 in the rotary valve member 46 varies communication with the inlet and outlet ports 62 and 64 as the valve member 46 is rotated between a substantially closed position which substantially inhibits the flow of fluid therethrough, to a desired predetermined open working position for maintaining a rate of flow at a constant or uniform value which is a function of the position of ports 74 with respect to inlet and discharge ports 62 and 64.

The valve member 46 is rotated through a limited angular range of travel by a valve actuator, for example, an electromagnetic means or a reversible electric motor 78. The valve actuator 78 could be any one of a number of conventional actuators for moving valve member 46 relative to inlet and discharge ports 62 and 64. In the preferred embodiment, the electric motor 78 is provided with a rotatable armature or magnetic member 80 which is operatively associated with field coils 82 that are carried by spaced, magnetic pole pieces 84 which are mounted on valve body 4. The armature 80 is fixedly secured, by any suitable means, to the center portion 86 of valve member 46 for rotation therewith at the same angular velocity. The center of rotation of armature 80, preferably, coincides with the center of rotation of valve member 46; thus, the valve member 46 effectively functions as the pivot for the rotatable armature 80.

The electric motor 78, as shown in FIG. 3, is provided with a plurality of spaced, magnetic pole pieces 84 which define a plurality of air gaps 88 therebetween. The armature 80 is disposed adjacent air gaps 88 and under some circumstances and for other applications, the armature 80 could be disposed in and extend through the air gaps 88. The armature 80 is constructed and arranged to proportionally respond to a magnetic force field developed in the air gaps 88 which results from the interaction of the magnetic fluxes developed, respectively by the pole pieces 84 and field coils 82. It will be seen that the permanent magnet pole pieces 84 provide a biasing flux, while the electrical signal flowing through the field coils 82 produces a control flux. The two fluxes are added and subtracted in alternate ones of the air gaps 88 to produce a torque which acts to rotate armature 80 and valve 46 until the torque is balanced against the flow forces on valve 46.

The forces on rotary valve member 46, as illustrated in FIGS. 4 and 5, are a combination of the static fluid pressure and the forces created by a predetermined fluid flow condition. When the valve member 46 is in the closed position, as shown in FIG. 4, the static pressure $P_s$ tends to move the valve member 46 downwardly against discharge port 64; thereby, forcing the outer peripheral surface 76, of each annulus 70 to contact intimately its respective complementary internal surface portion 18 or 20. Should sufficient force be applied, the valve member 46 will freeze, weld or bind to internal surfaces 18 or 20, due to this pressure differential between the inlet port 62 and discharge port 64. To alleviate this differential freezing condition, each outer surface 76 of each annulus 70 is provided with a set of diametrically opposed, substantially parallel, flat or planar surfaces 90 and 92. Each set of opposed flat surfaces 90 and 92 is positioned adjacent opposite ends of each port 74 and extends laterally from an edge portion thereof. Each set of flat surfaces 90 and 92 is coextensive with the outer surface 76 of each annulus 70 in a generally longitudinal direction; thus, each flat surface 90,92 is constructed and arranged to define with its respective internal surface 18 or 20 a fluid pressure-balancing conduit 94 which interconnects adjacent annular grooves 72 on opposite sides of each annulus 70. Thus, the valve member 46 is balanced by the provision of a flat surface 92 on the outer surface 76 which is positioned over the discharge port 64 in the closed position, as shown in FIG. 4; and likewise, disposing a substantially identical flat surface 90 on the opposite side thereof. The fluid pressure exerted on flat surface 90 is directed by way of adjacent grooves 72, and an appropriate conduit 94, against the opposite flat surface 92; this effectively balances valve member 46 with respect to a differential between the supply and discharge pressure. In addition, the pressurized fluid is forced between the outer peripheral surfaces 76 and the internal surfaces 18 and 20. The valve member 46 is lifted, separated or spaced from surfaces 18 and 20 by this continuous film of pressurized fluid which completely surrounds valve member 46, for inhibiting attrition between the relatively moving parts and to help dissipate any heat generated. This continuous film of pressurized fluid effectively supports rotatable valve member 46, which is substantially free from the usual attachment or support, within cavity 16. Thus, the floating valve member 46 is freely mounted and substantially buoyed in a fluid under all operating conditions. This type of fluid support arrangement results in less wear, reduction in vibration and substantially contact free operation of valve member 46. The construction and arrangement of valve member 46 is such that the forces on all surfaces are substantially equally balanced at all times; thereby, inhibiting differential sticking or freezing of the valve member 46 under generally all conditions of fluid flow. Moreover, under the above-described operating conditions the longitudinal axis of valve member 46 is held at or substantially coincides with the longitudinal axis of cavity 16, whereby the valve member 46 floats on or is supported by a fluid film of substantially constant or uniform thickness.

A discharge metering orifice 96, as shown in FIG. 5, is defined between each port 74 and each discharge port 64, and is rectangular in configuration for effectively creating a fan-shaped free discharge stream having a very efficient spread flow pattern. The angle at which the discharge stream emerges from orifice 96, preferably, is within a range between 10° to 20° relative to a vertical plane passed through the longitudinal axis of valve member 46. This inclination of the discharge stream is due to the configuration of valve arrangement 2 and, more particularly, to the offset relationship between the inlet port 62 and discharge port 64. Preferably, the discharge port 64 is disposed in aligned relationship with valve member 46 while the inlet port 62 is offset to one side of the longitudinal axis of valve member 46. This inclination could be utilized to advantage, for example, in vehicle fuel systems by orienting the valve arrangement 2 such that the free discharge stream is directed forwardly toward the nose of a vehicle, in which it could be employed, for greater fuel injection efficiency. The present valve arrangement 2 produces a very solid free fluid discharge by utilizing the sharp edges of metering orifice 96 and the good fluid entry conditions created by positioning the inlet supply manifolds 56 and 58 directly above cavity 16 and the provision whereby each discharge orifice 96 is supplied independently through an appropriate inlet 62. Such an arrangement will greatly reduce flow interaction and the substantially straight through feed will accomplish flow turning upstream of each discharge orifice 96, thereby reducing rotary turbulence which tends to sling the free stream apart and effectively straightens the fluid flow before metering through each orifice 96.

Having thus described both the details of the valve arrangement 2 and the valve actuator 78, added reference is now made to FIG. 6 which shows a proportional control system 98. Such a proportional control system is generally described as controller operation or action in which there is a continuous relationship between the value of a controlled variable and the final position of the control element; or the output from the controller is proportional to the input thereto. Preferably, the self-operating control valve arrangement 2 is equipped with a proportional control system 98; so that the valve member 46 is positioned at the correct angular relationship with respect to discharge ports 64 to obtain a desired set point or predetermined discharge flow rate. The proportional control system 98 includes a closed-loop feedback control system or means 100. This feedback control 100 utilizes a motion transducer 102 of the type that provides an electromotive signal which varies in proportion to the rotation of valve member 46 for indicating the relative position of valve member 46 with respect to discharge ports 64. This signal is compared or summed with another predetermined, known reference or command electromotive signal that is proportional to a desired predetermined coefficient or rate of fluid flow through each variable orifice 96, as determined by the desired predetermined open working position of valve member 46 relative to discharge ports 64. The primary features of the proportional control system 98 comprises a reference or command electromotive input or signal which is proportional to the predetermined open working position of valve member 46. The command signal emanates from an autopilot 104 or some other suitable source. This command signal is summed with the position feedback electromotive input or signal, which is received from transducer 102, in a conventional error detector and amplifier device 106. This comparison of the command input with the feedback input produces a resultant electromotive force in the form of an actuating or error signal which is amplified; and the electric motor 78 is energized to reposition the valve member 46, thereby substantially eliminating or reducing the actuating or error signal to zero value. The transducer 102 is provided with a generally cylinderlike housing 108 which is threadedly connected at 110 to valve body 4, in such a manner that the longitudinal axis or transducer 102 is substantially transverse to the longitudinal axis of valve member 46. The housing 108 has an inner wall portion defining a hollow compartment or cavity 112 that encloses a primary coil 114 and a secondary coil 116. The coils 114 and 116 are made of relatively fine wire and are fixedly attached, by suitable means, to the inner wall portion of cavity 112. At least one opening is provided in the inner wall of cavity 112 and is constructed and arranged to receive a bushing 118 which is adapted to slidably, yet snugly support elongate, movable slider, magnetic core, or feedback member 120; thereby, permitting slider 120 to reciprocate in a substantially parallel manner, relative to both the primary and secondary coils, 114 and 116. Bushing 118 additionally functions as a fluid-sealing means to preclude the entry of dirt and moisture into cavity 112. A sine-wave generator 122, or some other conventional means for placing an alternating electromotive force or potential across primary coil 114, is connected through leads 124 and 126 to opposite terminals of primary coil 114. The opposite terminals of secondary coil 116 are connected through leads 128 and 130 to amplifier 106 which electrically interconnects the autopilot 104 with electric motor 78. A coil or compression spring 132 is disposed within the confines of cavity 112, and has one end which bears against one end of slider 120 and the opposite end bears against the inner surface portion of cavity 112. Spring 132 constantly, yieldably urges the other end of slider 120 toward and into a motion transfer relationship with cam surface 134 on valve member 46; thus, the slider 120 is moved relative to both the primary and secondary coils, 114 and 116, in proportion to a desired mechanical input or rotary movement of cam surface 134. The spring 132 generally has sufficient preload to prevent movement of slider 120 when subjected to acceleration and/or vibration.

In operation, when the autopilot 104 sends out a command signal to amplifier 106 the electric motor 78 is energized, and the valve member 46 is rotated to a predetermined, open working position for providing a desired flow rate. The rotation of the valve member 46 through a limited angular distance provides a direct linear relationship between the size of orifice 96 and the movement of slider 120. Thus, any error in the size of orifice 96 will be sensed by feedback transducer 102 which, in turn, sends a feedback signal to amplifier or means 106 which sums the command and feedback signals to obtain an actuating or error signal for energizing the field 82 of electric motor 78. Amplifier 106 is an operational amplifier of a type well known in the art. For instance, in the laboratory, a Bipolar Operational Power Amplifier, Model BOP 36–5M, manufactured by the KEPCO Company, 131–38 Sanford Avenue, Flushing, New York 11352, was used in the embodiment described. Those skilled in the art will recognize that integrated circuit or other types of operational amplifiers can be used in this embodiment in cooperation with a suitable power amplifier to get the same result. The magnetic field created by the error signal varies the angular position of armature 80 which simultaneously adjusts the angular position of valve member 46 to its predetermined open working position. The motion transducer 102, as shown in FIG. 6, is a transformer type construction in which a movable magnetic core 120 is moved axially in response to movement of cam surface 134. The magnetic core 120 is generally centered with respect to the primary and secondary coils, 114 and 116; thus, when the core 120 is moved in one direction, from its center or null position, the output voltage from the secondary coil 116 is in phase with the excitation voltage, and when the core 120 is moved in the opposite direction, from center, the output voltage is 180° out of phase. When the core 120 is in the center position the output voltage to the secondary coil 116 is substantially zero, and the valve member 46 is in the predetermined open working position. Should the valve member 46 be displaced from its predetermined, open working position, the core 120 will move in one direction from its centered position, and the feedback voltage will increase as a function of the core 120 displacement. Thus, the feedback signal has two analog components: (1) phase relationship with the excitation voltage, indicating direction of travel; and (2) voltage amplitude, indicating length of travel.

From the above description, it is readily apparent many additional advantages reside in the unique valve arrangement and control mechanism. The main advantage obtained from the present invention concept is the simplicity of the valve, in that, only two parts make up the valve, the valve body and the spool. Further, the compactness, central location of the armature, and fluid support of the valve spool, allows the valve spool to function as the armature pivot; thereby, reducing the mass of valve arrangement 2 and effecting a balanced rotary motion which substantially reduces sensitivity to acceleration and vibration; moreover, the combination is mass balanced. Also, a low inertia, small diameter valve spool is made possible by disposing the inlet ports along the side of the valve body. In addition, the valve spool metering concept offers many advantages in producibility, accuracy, reliability and leakage control over prior art pintle metering concepts. Moreover, low torque requirements are made possible by the small diameter valve spool and the means for force balancing the valve spool.

While only one embodiment of the invention has been described in detail herein and shown in the accompanying drawing, it will be evident that various further modifications are possible in the arrangement and construction of its components without departing from the scope of the invention.

What is claimed is:

1. A device for regulating the flow of fluid comprising:
  a valve body having an interior surface defining a chamber therein, said valve body including means for defining a plurality of spaced fluid inlets and a plurality of spaced fluid outlets communicating with the chamber;
  rotatable valve member means disposed within the confines of the chamber and mounted for movement relative to the fluid inlets and fluid outlets for controlling the communication of fluid therebetween, said valve member means being provided with a plurality of longitudinally spaced annuli, each annulus having an opening extending therethrough with each opening, in each annulus, being constructed and arranged to cooperate with a complimentary outlet for defining a variable discharge orifice therebetween;

means for producing a command signal proportional to a predetermined open working position of said valve member means;

electromagnetic means responsive to the command signal for moving said valve member means between a closed position for interrupting the flow of fluid and the predetermined open working position for effecting a desired predetermined fluid flow condition, said electromagnetic means having a magnetic member fixedly secured to said valve member means for movement therewith, and said electromagnetic means constructed and arranged to create a magnetic field for moving the magnetic member which simultaneously moves said valve member means between the closed and open working positions; and control means for detecting and summing at least two signals for producing an error signal which is a resultant of said signals, one of the signals being the command signal, said control means including feedback means for generating the other signal when said valve member means is moved to another position, said other signal being proportional to the another position of said valve member means, and said control means operatively connected to the electromagnetic means with said electromagnetic means being responsive to the error signal for varying a magnetic field to move said valve member means from the another position toward the predetermined open working position where the error signal is substantially eliminated.

2. The valve mechanism recited in claim 1, wherein the electromagnetic means includes a reversible electric motor.

3. The valve mechanism recited in claim 2, wherein the reversible electric motor is provided with an electric coil operatively associated with a plurality of spaced magnetic pole members defining at least one air gap therebetween, a movable armature disposed adjacent the air gap, said armature being fixedly secured to the valve member means for simultaneous movement therewith at a common speed, with said armature being constructed and arranged to proportionately respond to a magnetic force field across the magnetic pole members.

4. The valve mechanism recited in claim 1, wherein the valve member means comprises a rotatable spool having an outer surface portion disposed in a complementary close-fitting relationship with respect to the interior surface of the chamber.

5. A valve mechanism for regulating the flow of fluid comprising:

a valve body having an interior surface defining a chamber therein, said valve body having means for defining an inlet and an outlet communicating with said chamber;

a floating valve member constructed and arranged for rotary movement within the confines of said chamber, said valve member being provided with spaced, axially aligned end portions interconnected by an elongate center portion, each end portion being provided with at least one annulus having an opening extending therethrough, with each opening being constructed and arranged to cooperate with the outlet to provide a substantially continuous fluid stream through the valve member and the device and to control the shape and flow rate of said fluid stream as it leaves the device, and each annulus having an outer surface portion disposed in a complementary close-fitting, but slightly spaced, relationship with respect to the interior surface of said chamber;

means for balancing the forces on substantially all surfaces of the valve member for inhibiting differential freezing of the valve member within said chamber, said balancing means including a portion of each annulus; and electromagnetic means for moving the valve member between a closed position for interrupting the flow of fluid and a predetermined open working position for effecting a desired predetermined fluid flow condition, said electromagnetic means includes a magnetic member fixedly secured to the elongate center portion of the valve member for rotation substantially coinciding with the center of rotation of the valve member, whereby the valve member functions as a pivot for the magnetic member.

6. The valve mechanism recited in claim 5, further including:

means for producing a command signal which is proportional to the desired predetermined open working position of the valve member; and control means for detecting and summing at least two signals for producing an error signal which is the resultant of said signals, one of the signals being the command signal, said control means including feedback means for producing the other signal which is proportional to another position of the valve member, said feedback means operatively connected to the electromagnetic means which is responsive to the error signal for moving the valve member from the another position toward the predetermined open working position where the error signal is substantially eliminated.

7. A device for regulating the flow of fluid comprising:

a valve body having an interior surface defining a chamber therein, said valve body including means for defining a plurality of spaced fluid inlets and a plurality of spaced fluid outlets;

rotatable valve member means disposed within the confines of said chamber and mounted for movement relative to the fluid inlets and the fluid outlets of said body for controlling the communication of fluid therebetween, said valve member means being provided with a plurality of axially aligned end portions interconnected by an elongated center portion, each end portion being provided with at least one annulus having an opening extending diametrically therethrough, and with each opening being constructed and arranged to cooperate with its respective complimentary outlet for defining therebetween a variable discharge orifice;

means for producing a command signal proportional to a predetermined open working position of said valve member means;

electromagnetic means responsive to the command signal for moving said valve member means between a closed position for interrupting the flow of fluid and the predetermined open working position for effecting a desired predetermined fluid flow condition, said electromagnetic means having a magnetic member fixedly secured to said valve member means for movement therewith, and said electromagnetic means constructed and arranged to create a magnetic field for moving the magnetic member which simultaneously moves said valve member means between the closed and open working positions; and control means for detecting and summing at least two signals for producing an error signal which is a resultant of said signals, one of the signals being the command signal, said control means including feedback means for generating the other signal when said valve member means is moved to another position, said other signal being proportional to the another position of said valve member means, and said control means operatively connected to the electromagnetic means with said electromagnetic means being responsive to the error signal for varying a magnetic field to move said valve member means from the another position toward the predetermined open working position where the error signal is substantially eliminated.

8. A valve mechanism for regulating the flow of fluid comprising:

a valve body having a chamber, said valve body having means for defining an inlet and outlet communicating with said chamber;

rotatable valve member means disposed within the confines of said chamber, said valve member means so constructed and arranged for movement relative to the inlet and the outlet of the valve body for regulating the flow of fluid therethrough;

actuator means for moving said valve member means between a closed position for interrupting the flow of fluid and a predetermined open working position for effecting a desired fluid flow condition;

control means for continuously monitoring the movement of said valve member means, said control means operatively associated with said valve member means and actuator means and including feedback means having a feedback member movable upon movement of said valve member means, said feedback operatively associated with said actuator means for moving said valve member means in proportion to the movement of the feedback member; and biasing means for constantly, yieldably urging said movable feedback member toward and into engagement with said valve member means.

9. The valve mechanism recited in claim 8, wherein the valve member means has a cam surface disposed in opposed relationship to the feedback member, for complementing and engaging the feedback member.